D. ARMEL.
Hay Rake.
No. 37,429.
Patented Jan. 20, 1863.
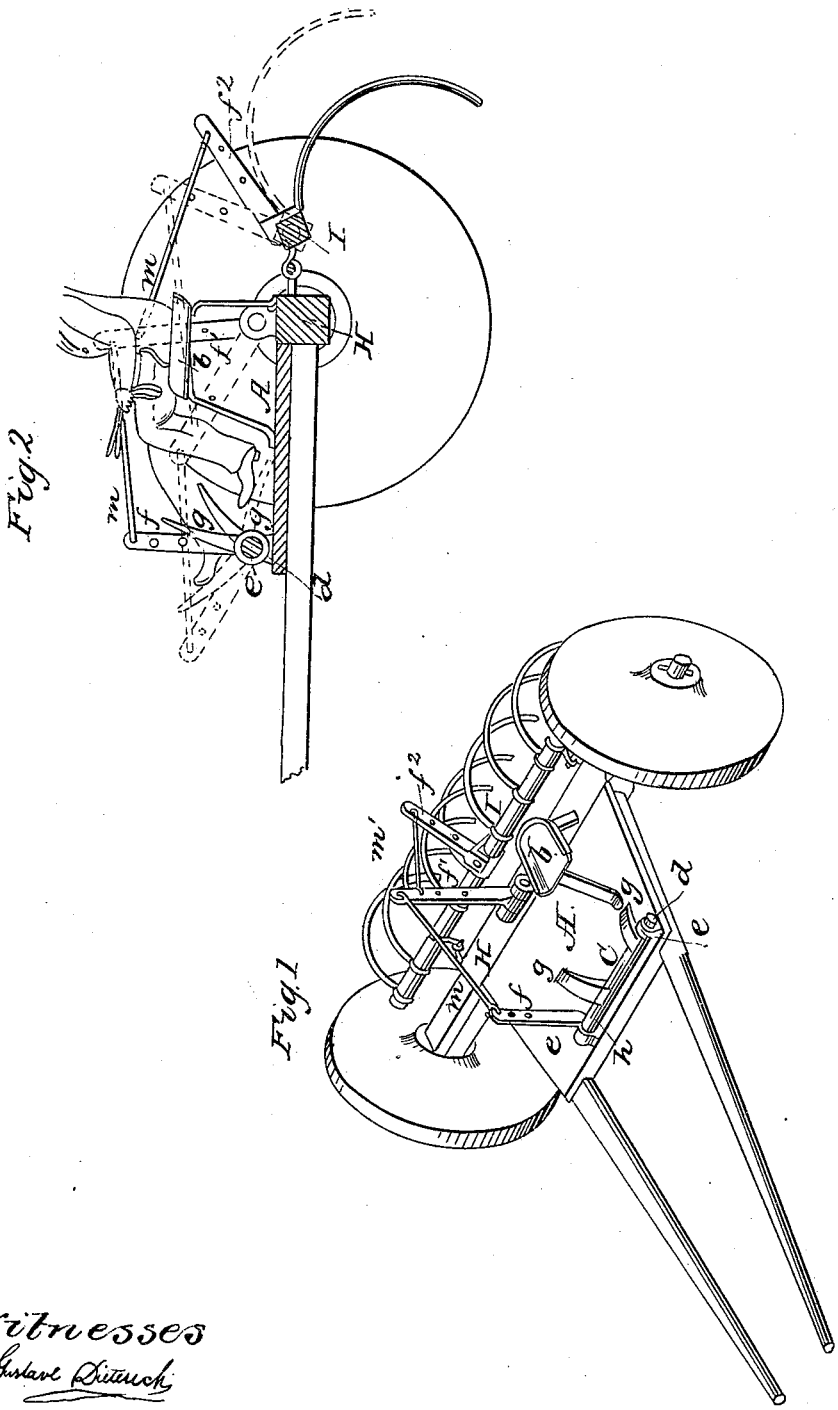

UNITED STATES PATENT OFFICE.

DANIEL ARMEL, OF SOMERSET, PENNSYLVANIA.

IMPROVEMENT IN HAY-RAKES.

Specification forming part of Letters Patent No. 37,429, dated January 20, 1863.

*To all whom it may concern:*

Be it known that I, DANIEL ARMEL, of Somerset, in the county of Somerset and State of Pennsylvania, have invented certain new and useful Improvements in Horse Hay-Rakes; and I do hereby declare that the following is a full and exact description thereof, reference being had to the accompanying drawings, and to the letters of reference marked thereon, like letters in the figures indicating the same parts, and in which drawings—

Figure 1 is a perspective view of my improvement, and Fig. 2 a sectional view thereof.

The object of my invention is the construction of a horse hay-rake which shall be easily operated, effective in action, not liable to get out of repair, and of small cost.

To attain this I provide the platform A, upon which the driver's seat $b$ is situated, with a treadle-lever, C, having its bearings $d$ confined in eyes $e\, e$, securely attached to the forward portion of the platform A, as clearly shown in Fig. 1, and situated directly in front of the driver's seat. The lever C is provided with an arm, $f$, rising at right angles therewith, as shown, and also with tread pieces or projections $g\, g'$, the former of which is pressed by the right foot of the driver and the latter by his left foot, as occasion may require, and as will hereinafter be explained.

The horizontal shaft $h$, with its bearings $d$, arm $f$, and tread-pieces $g\, g'$, are cast or made of a single piece of metal, and together constitute the treadle-lever C. As shown in Fig. 1, when the rake-teeth are in position to gather hay or other material the tread-piece $g'$ is in such position to readily admit the application of the left foot of the driver upon it, and thus, by retaining it in such position, also hold the rake to its work, as indicated in said figure. As also clearly shown in Fig. 1, the tread-piece $g$, while the rake is at its gathering-work, is in proper position and relation to the right foot of the driver, in order that he may press or thrust such foot against it whenever the moment arrives for discharging the gathered hay, as indicated in red lines, Fig. 2.

At the right of the driver's seat, and opposite the arm $f$, a hinged arm, $f'$, is provided, the same being made to articulate in eyes firmly secured to the axle H, as shown. Directly in rear of the arm $f'$, I also provide the rake I with an arm, $f^2$, and secured so as to rise and fall or articulate with the rake. All of these arms, $f$, $f'$, and $f^2$, are perforated, as shown, for the insertion of hooked connecting-rods $m$ and $m'$, for the purpose of elevating and depressing the rake, as well as for regulating the "throw" of the rake or the height at which it may be raised for the discharge of its contents.

It is evident from the foregoing description that the driver has perfect command of the rake I, either for holding it to its work by simply pressing his left foot upon $g'$, or for discharging the contents of the rake by pressing his right foot against the piece $g$, all of which action gives him the free use of his arms for guiding the horse attached to the machine.

It will also be seen that by the arrangement of the lever-arms $f$, $f'$, and $f^2$ in relation to each other and the treadle-lever C a slight movement of the treadle-lever may be made to produce a comparatively great movement of the rake-teeth. At the same time an advantageous leverage power is gained to effect such movement.

Having thus described my invention, what I claim as new, and desire to secure by Letters Patent of the United States, is—

The combination of the tread-lever C with the platform A, seat $b$, and arms $f'\, f^2$, substantially as and for the purpose described.

Witness my hand in the matter of my application for a patent for improved hay-rake this 30th day of September, A. D. 1862.

DANIEL ARMEL.

Witnesses:
J. C. KURTZ,
JOHN H. BENFORD.